UNITED STATES PATENT OFFICE 2,365,938

WAX SUBSTITUTED DIARYL DITHIOPHOSPHORIC ACIDS AND SALTS THEREOF

Elmer W. Cook, New York, N. Y., and William D. Thomas, Jr., Stamford, Conn., assignors to American Cyanamid Company, New York, N. Y., a corporation of Maine No Drawing. Application October 17, 1941, Serial No. 415,410

16 Claims. (Cl. 260—461)

This invention relates to new chemical compounds and their preparation, and more particularly to wax substituted diaryl dithiophosphoric acids and salts thereof.

The compounds of the present invention to be described and claimed herein by us may be represented by the general formula

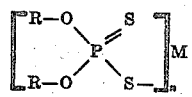

in which R represents a wax substituted aryl radical, M is hydrogen or a salt-forming radical and $n$ is the valence of hydrogen or of the salt-forming radical.

These compounds have a strongly polar group and high molecular weight hydrophobe groups and accordingly show detergent properties. As the wax substituted aryl radicals contain long chain alkyl groups the compounds are readily soluble in oils making them particularly valuable in the petroleum field. They may be added to lubricating oils as detergents to disperse sludge thereby preventing varnish formation, ring sticking, etc. They also show antioxidant properties and are useful in lubricating oils to prevent sludge formation and bearing corrosion. Our compounds have also been found to be of value as pour point depressants in lubricating oils. Being water insoluble and polar in character they are valuable in the preparation of slushing oils. Because of their sulfur and phosphorus content they may be advantageously added to hypoid gear lubes and other high pressure lubricants. They are also useful in the flotation of ores and some of their salts, particularly their lead and mercury salts, may be employed in insecticides and fungicides.

Our new compounds are prepared by heating a wax substituted hydroxyaromatic compound with phosphorus pentasulfide ($P_2S_5$) at temperatures of the order of 130–160° C. The reaction takes place according to the following equation

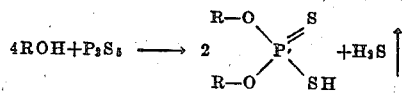

from which it is seen that 1 mole of $P_2S_5$ reacts with 4 moles of the wax substituted hydroxyaromatic compound with the elimination of one mole of $H_2S$. The reaction may be brought to a satisfactory degree of completion in one hour but extended heating, for example more than five hours, should be avoided since the product tends to form thio-anhydrides by the elimination of $H_2S$. The wax substituted diaryl dithiophosphoric acid thus formed is a liquid and may be decanted from any unreacted $P_2S_5$. Suitable salts of these wax substituted diaryl dithiophosphoric acids may be prepared by simple neutralization of the compound with salt-forming bases or by double decomposition with its sodium salt.

The wax substituted hydroxyaromatic compounds to be reacted with $P_2S_5$ are prepared in known manner by condensation of a halogenated wax, such waxes being generally characterized by long alkyl chains having at least 20 carbon atoms, with a hydroxyaromatic compound in the presence of a Friedel-Crafts catalyst. The chlorinated waxes used in such syntheses are generally those prepared by chlorination of waxes derived from petroleum which are usually mixtures of long chain aliphatic compounds having 22–26 or more carbon atoms in the chain. The hydroxyaromatic compounds may have one or more hydroxy groups per molecule and may also be of the single, double, or triple ring type. We prefer to use, however, those wax substituted hydroxyaromatic compounds prepared from single ring structures such as in the case of phenol. The wax substituted product ordinarily has at least one long chain alkyl group per molecule, but may have two or more without unduly affecting its desirable properties. In addition to having long chain alkyl groups substituted in one or more of the positions in the ring the wax substituted hydroxy aromatic compounds may also have other radicals attached thereto such as the shorter chain alkyl, aryl, aralkyl and alkoxy groups.

Among the hydroxyaromatic compounds which may be reacted with chlorinated waxes to provide suitable intermediates are phenol, cresol, xylenol, hydroxy diphenyl, hydroxy diphenyl ether, hydroxy diphenyl monosulfide, methyl hydroxy diphenyl, benzyl phenol, α and β naphthol, methyl α and β naphthol, benzylnaphthol, guaiacol, chlorphenol and phenol-formaldehyde condensation products in their lower stages of polymerization. Since the preparation of wax substituted hydroxyaromatic compounds is well known further discussion of these products and their preparation appears to be unnecessary.

The wax substituted diaryl dithiophosphoric acids may be made into salts by simple neutralization with a suitable salt-forming base or by double decomposition. A wide variety of salt-forming radicals including those of nickel, aluminum, lead, mercury, cadmium, tin, zinc, magnesium, sodium, potassium, ammonium, calcium, strontium and barium may be introduced by neutralizing the acid with their oxides, hydroxides or carbonates. The alkaline earth salts are preferred as lubricating oil additives. The preparation of our new compounds will now be described in greater detail by means of the following example to which, however, our invention is not limited since it is given merely for purposes of illustration. Obviously, many modifications thereof may be made without departing from the scope of our invention as set forth in the appended claims.

*Example*

32 parts by weight of phenol and 150 parts by weight of chlorinated wax, containing 16% chlorine, were dissolved in 50 parts by volume of A. S. T. M. precipitation naphtha. The solution was then cooled and 16 parts by weight of anhydrous aluminum chloride were added with stirring. While continuing the stirring the mixture was slowly heated and refluxed for three hours. The mixture was then cooled and treated with 150 parts cool dilute hydrochloric acid. 150 parts by volume of naphtha was then added and the solution extracted four times with water. The naphtha was then evaporated leaving a wax substituted phenol.

155 parts by weight of wax substituted phenol was stirred and heated with 21 parts by weight of P$_2$S$_5$ for 2.5 hours at 140-145° C. The resulting brown-colored liquid was decanted from a small amount of unreacted P$_2$S$_5$ and was found to consist of wax-substituted diphenyl dithiophosphoric acid of the formula

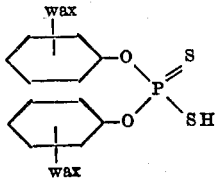

150 parts by weight of the above di(wax phenyl) dithiophosphoric acid was dissolved in a mixture of 87 parts by weight of toluene and 39 parts by weight of ethyl alcohol. 12 parts by weight of finely powdered barium oxide was added to the solution and the mixture heated at about 40-60° with stirring until it was neutralized. 87 parts by weight of toluene was then added and the solution filtered to remove traces of inorganic barium salts. The filtrate was then evaporated under reduced pressure to remove the solvent. The resulting barium salt of di(wax phenyl) dithiophosphoric acid was an amber-colored liquid easily soluble in lubricating oil.

What we claim is:

1. Compounds having the general formula

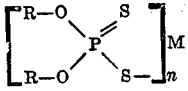

in which R is a paraffin wax substituted aryl radical said wax substituent containing at least 22 carbon atoms, M is a member of the group consisting of hydrogen and basic salt-forming groups and $n$ is the valence of hydrogen or the basic salt-forming group.

2. Compounds having the general formula

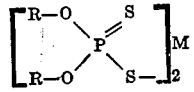

in which R is a paraffin wax substituted aryl radical said wax substituent containing at least 22 carbon atoms, and M is an alkaline earth metal.

3. Compounds having the general formula

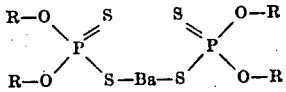

in which R is a paraffin wax substituted aryl radical said wax substituent containing at least 22 carbon atoms.

4. Compounds having the general formula

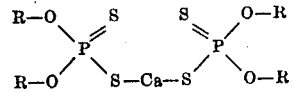

in which R is a paraffin wax substituted aryl radical said wax substituent containing at least 22 carbon atoms.

5. Compounds having the general formula

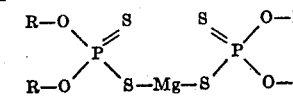

in which R is a paraffin wax substituted aryl radical said wax substituent containing at least 22 carbon atoms.

6. Compounds having the general formula

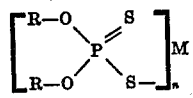

in which R is a paraffin wax substituted phenyl radical said wax substituent containing at least 22 carbon atoms, M is a member of the group consisting of hydrogen and basic salt-forming groups and $n$ is the valence of hydrogen or the basic salt-forming group.

7. Compounds having the general formula

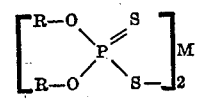

in which R is a paraffin wax substituted phenyl radical said wax substituent containing at least 22 carbon atoms, and M is an alkaline earth.

8. Compounds having the general formula

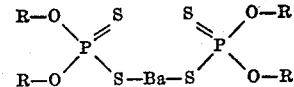

in which R is a paraffin wax substituted phenyl radical said wax substituent containing at least 22 carbon atoms.

9. Compounds having the general formula

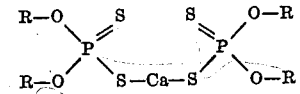

in which R is a paraffin wax substituted phenyl radical said wax substituent containing at least 22 carbon atoms.

10. Compounds having the general formula

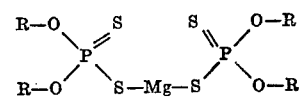

in which R is a paraffin wax substituted phenyl radical said wax substituent containing at least 22 carbon atoms.

11. A method of preparing paraffin wax substituted diaryl dithiophosphoric acid which comprises heating paraffin wax substituted hydroxyaromatic compounds said paraffin wax substituent containing at least 22 carbon atoms with $P_2S_5$ at temperatures within the range 130–160° C.

12. A method of preparing paraffin wax substituted diphenyl dithiophosphoric acid which comprises heating paraffin wax substituted phenols said paraffin wax substituent containing at least 22 carbon atoms with $P_2S_5$ at temperatures within the range 130–160° C.

13. A method of preparing paraffin wax substituted diaryl dithiophosphates which comprises heating paraffin wax substituted hydroxyaromatic compounds said paraffin wax substituent containing at least 22 carbon atoms with $P_2S_5$ at temperatures within the range 130–160° C. and neutralizing the resulting product with a salt-forming base.

14. A method of preparing paraffin wax substituted diaryl dithiophopshates which comprises heating paraffin wax substituted hydroxyaromatic compounds said paraffin wax substituent containing at least 22 carbon atoms with $P_2S_5$ at temperatures within the range 130–160° C. and neutralizing the resulting product with barium oxide.

15. A method of preparing paraffin wax substituted diphenyl dithiophosphates which comprises heating paraffin wax substituted phenols said paraffin wax substituent containing at least 22 carbon atoms with $P_2S_5$ at temperatures within the range 130–160° C. and neutralizing the resulting product with a salt-forming base.

16. A method of preparing paraffin wax substituted diphenyl dithiophosphates which comprises heating paraffin wax substituted phenols said paraffin wax substituent containing at least 22 carbon atoms with $P_2S_5$ at temperatures within the range 130–160° C. and neutralizing the resulting product with barium oxide.

ELMER W. COOK.
WILLIAM D. THOMAS, Jr.